United States Patent
Sano et al.

(10) Patent No.: US 8,182,256 B2
(45) Date of Patent: *May 22, 2012

(54) SHEET OR FILM FORMING ROLL, SHEET OR FILM CASTING APPARATUS, AND MINIATURE PATTERN TRANSFERRING APPARATUS

(75) Inventors: Takayoshi Sano, Fuji (JP); Daichi Yukawa, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 249 days.

This patent is subject to a terminal disclaimer.

(21) Appl. No.: 12/518,511

(22) PCT Filed: Dec. 10, 2007

(86) PCT No.: PCT/JP2007/073797
§ 371 (c)(1),
(2), (4) Date: Oct. 23, 2009

(87) PCT Pub. No.: WO2008/072603
PCT Pub. Date: Jun. 19, 2008

(65) Prior Publication Data
US 2010/0119639 A1      May 13, 2010

(30) Foreign Application Priority Data
Dec. 11, 2006   (JP) ................. 2006-333471

(51) Int. Cl.
*B29C 59/04* (2006.01)

(52) U.S. Cl. ............ 425/363; 165/89; 425/471; 492/46

(58) Field of Classification Search .......... 425/224, 425/363, 445, 446, 471; 492/16, 46; 165/89
See application file for complete search history.

(56) References Cited

U.S. PATENT DOCUMENTS

| 3,470,948 A | 10/1969 | Korsch |
| 3,490,119 A | 1/1970 | Fukuyama et al. |
| 3,747,181 A | 7/1973 | Nykopp et al. |
| 4,068,360 A | 1/1978 | Freuler |
| 4,071,081 A | 1/1978 | Chielens et al. |
| 4,233,011 A | 11/1980 | Bolender et al. |
| 4,440,214 A | 4/1984 | Wedel |

(Continued)

FOREIGN PATENT DOCUMENTS
CN    1834567 A    9/2006
(Continued)

OTHER PUBLICATIONS

Notice of Allowance issued in counterpart Taiwan Application No. 096147234 on Jan. 27, 2010.

(Continued)

*Primary Examiner* — James Mackey
(74) *Attorney, Agent, or Firm* — DLA Piper LLP US

(57) ABSTRACT

By provision of a plurality of rolling rubber rolls 70 each adapted for a sliding contact with an outer circumferential surface of a central rotational shaft 20 and a sliding contact with an inner circumferential surface of an outer tube 40, an annular space between the central rotational shaft 20 and the outer tube 40 is divided by the rolling rubber rolls 70 in the circumferential direction into a plurality of heat medium chambers 91, 92, 93, and 94, the plurality of heat medium chambers being each respectively configured for individual conduction of heat medium.

6 Claims, 11 Drawing Sheets

U.S. PATENT DOCUMENTS

| | | | |
|---|---|---|---|
| 4,823,450 | A | 4/1989 | Ramisch et al. |
| 5,060,357 | A | 10/1991 | Roerig et al. |
| 5,188,273 | A | 2/1993 | Schmoock |
| 5,567,448 | A | 10/1996 | Frankland |
| 5,943,895 | A | 8/1999 | Lemper |
| 5,945,042 | A * | 8/1999 | Mimura et al. ............... 425/385 |
| 5,984,568 | A | 11/1999 | Lohbeck |
| 5,984,658 | A * | 11/1999 | Shimizu ........................ 425/363 |
| 6,129,017 | A | 10/2000 | Mohrmann et al. |
| 6,221,301 | B1 * | 4/2001 | Tsunashima et al. ......... 425/224 |
| 6,568,931 | B2 * | 5/2003 | Fujii et al. ..................... 425/363 |
| 7,367,794 | B2 * | 5/2008 | Sano ............................. 425/471 |
| 7,811,218 | B2 * | 10/2010 | Sano et al. ...................... 492/46 |
| 7,825,320 | B2 | 11/2010 | Yatsui |
| 7,846,367 | B2 | 12/2010 | Sano |
| 7,850,587 | B2 | 12/2010 | Sano |
| 7,963,037 | B2 | 6/2011 | Garben |
| 2004/0113316 | A1 | 6/2004 | Fuji et al. |
| 2006/0211556 | A1 | 9/2006 | Sano |
| 2007/0052118 | A1 | 3/2007 | Kudo et al. |
| 2007/0063376 | A1 | 3/2007 | Sano et al. |
| 2009/0297777 | A1 | 12/2009 | Sano et al. |
| 2010/0119639 | A1 | 5/2010 | Sano et al. |

FOREIGN PATENT DOCUMENTS

| | | |
|---|---|---|
| CN | 1928648 | 3/2007 |
| DE | 1251188 | 9/1967 |
| DE | 1575524 | 1/1970 |
| DE | 69731321 | 10/2005 |
| DE | 102006012398 | 9/2006 |
| DE | 102006044463 | 5/2007 |
| JP | H03-227858 | 10/1991 |
| JP | 4-164741 | 6/1992 |
| JP | H08-230018 | 9/1996 |
| JP | H10-217314 | 8/1998 |
| JP | 10-315304 | 12/1998 |
| JP | 11-207817 | 8/1999 |
| JP | 11-235747 | 8/1999 |
| JP | H11-235747 | 8/1999 |
| JP | H11-314263 | 11/1999 |
| JP | 2000-506795 | 6/2000 |
| JP | 2000-239409 | 9/2000 |
| JP | 3194904 B2 | 8/2001 |
| JP | 2002-036332 | 2/2002 |
| JP | 3422798 | 6/2003 |
| JP | 2005-138509 | 6/2005 |
| JP | 2006-256159 | 9/2006 |
| JP | 2007 14452 | 4/2007 |
| JP | 2007-083577 | 4/2007 |
| KR | 10-0671216 | 1/2007 |
| KR | 2007-26264 | 3/2007 |
| TW | 019205 | 9/1975 |
| TW | 189464 | 8/1992 |
| TW | 194705 | 11/1992 |
| TW | 324686 | 1/1998 |
| TW | 496797 | 8/2002 |
| TW | 2007 16356 | 5/2007 |
| WO | WO 97/34754 A1 | 9/2007 |

OTHER PUBLICATIONS

Search Report issued in counterpart Taiwan Application No. 096147234 on Jan. 26, 2010.
English abstract of CN1834567A issued on Sep. 20, 2006.
Machine English language translation of JP 3194904B2 issued on Aug. 6, 2001.
English abstract of TW324686 issued on Jan. 11, 1998.
English abstract of JP-2006-256159, Sep. 28, 2006.
Machine English language translation of JP-2006-256159, Sep. 28, 2006.
English abstract of JP-2007-083577, Apr. 5, 2007.
Machine English language translation of JP-2007-083577, Apr. 5, 2007.
English abstract of JP-11-235747, Aug. 31, 1999.
Machine English language translation of JP-11-235747, Aug. 31, 1999.
German Office Action issued in Application No. 102006044463.9-16 mailed Jan. 24, 2008.
English translation of German Office Action issued in Application No. 102006044463.9-16 mailed Jan. 24, 2008.
English translation of DE 1 251 188, published Sep. 28, 1967.
Taiwan IPO Search Report issued in Application No. 095134908 mailed Jul. 30, 2008.
English language abstract of Taiwan IPO Search Report issued in Application No. 095134908 mailed Jul. 30, 2008.
English language translation of TW189464 published Aug. 21, 1992.
English language abstract of TW019205 published Sep. 1, 1975.
Machine English language translation of JP 11-207817 published Aug. 3, 1999.
English language abstract of JP 04-164741 published Jun. 10, 1992.
English language abstract of JP 11-207817 published Aug. 3, 1999.
Office Action issued in Japanese Application No. 2005-275602, dated Feb. 10, 2009.
English language translation of Office Action issued in Japanese Application No. 2005-275602, dated Feb. 10, 2009.
English language abstract of International Application No. WO 97/28950, which was also published as JP 3422798.
Korean Office Action mailed Sep. 18, 2007; Application No. 10-2006-133621.
English translation of Korean Abstract published under Korean Publication No. 10-0671216.
German Office Action issued in Application No. 10 2006 061040.7-16 mailed Mar. 19, 2008.
English Translation of German Office Action issued in Application No. 10 2006 061040.7-16 mailed Mar. 19, 2008.
Chinese Office Action issued in Application No. 200610156230.2 dated Oct. 31, 2008.
English language translation of Office Action issued Chinese Application No. 200610156230.2 dated Oct. 31, 2008.
English Language Machine Translation of JP 2002-036332 published Feb. 5, 2002.
English Language Abstract of JP 2002-036332 published Feb. 5, 2002.
English Language Machine Translation of JP 3422798 published Jun. 30, 2003.
English Language Machine Translation of JP 2000-506795 published Jun. 6, 2000.
Notice of Allowance in Taiwan application No. 0951490256, issued on Jun. 25, 2009.
English Language Abstract of JP 2005-138509 published Jun. 2, 2005.
English Language Machine Translation of JP 2005-138509 published Jun. 2, 2005.
Search Report in Taiwan application No. 095149026, issued on Jun. 25, 2009.
English translation of search report in Taiwan application No. 095149026, issued on Jun. 25, 2009.
English Language Abstract of JP 3422798 published Jun. 30, 2003.
English Language Translation of TW 496797 published Aug. 1, 2002.
English Language Abstract of JP 2000-506795 published Jun. 6, 2000.
English Language Abstract of DE 69731321 published Oct. 20, 2005.
English Language Machine Translation of JP 10-315304.
Korean Office Action mailed Oct. 21, 2009 in Application No. 10-2008-47783.
English Language Abstract of KR 2007-26264 published Mar. 8, 2007.
Partial English Language translation for Korean Office Action mailed Oct. 21, 2009 in Application No. 10-2008-47783.
Office Action issued in JP 2005-376468 on Apr. 13, 2010.
English Language Translation of Office Action issued in JP 2005-376468 on Apr. 13, 2010.
Office Action issued in JP 2005-376029 on Apr. 13, 2010.
English Language Translation of Office Action issued in JP 2005-376029 on Apr. 13, 2010.
English Language Abstract of JP 2000-239409 published Sep. 5, 2000.

English machine language translation of JP 2000-239409 published Sep. 5, 2000.
English Language Abstract of JP H 10-217314 published Aug. 18, 1998.
English machine language translation of JP H 10-217314 published Aug. 18, 1998.
English Language Abstract of JP H 11-314263 published Nov. 16, 1999.
English machine language translation of JP H 11-314263 published Nov. 16, 1999.
U.S. Appl. No. 11/614,223.
U.S. Appl. No. 12/473,579.
U.S. Appl. No. 11/534,339.
English Language Abstract of JP 3-227858 published Oct. 8, 1991.
International Search Report issued in PCT/JP2007/073797 published Feb. 5, 2008.
Korean Office Action issued in KR Appl. No. 10-2009-46397 on Nov. 19, 2010.
Partial English Language Translation of Korean Office Action issued in KR Appl. No. 10-2009-46397 on Nov. 19, 2010.
English abstract of JP-10-315304 published Dec. 2, 1998.
Office Action issued in Chinese Appl 200810109176.5 on Mar. 8, 2010.
English Language Translation of Office Action issued in Chinese Appl 200810109176.5 on Mar. 8, 2010.
Decision of Refusal issued in Chinese Appln. 200810109176.5 on Nov. 9, 2010.
English Translation of Decision of Refusal issued in Chinese Appln. 200810109176.5 on Nov. 9, 2010.
English Language Abstract of CN 1928648 published Mar. 14, 2007.
Office Action issued in TW97119277 on Dec. 3, 2010.
English Language Translation of Office Action issued in TW97119277 on Dec. 3, 2010.
English Language Abstract of TW200716356 published May 1, 2006.
English Language Abstract of TW200714452 published on Apr. 16, 2007.
English abstract of JP-H08-230018 published Sep. 10, 1996.
Machine English language translation of JP-H08-230018 published Sep. 10, 1996.
Chinese Office Action issued in CN 200810109176.5 on May 25, 2011.
English Language Translation of Chinese Office Action issued in 200810109176.5 on May 25, 2011.
English abstract of JP-2007-083577.
Machine English language translation of JP-2007-083577.
Korean Office Action issued in KR10-2009-46404 issued on Nov. 19, 2010.
Partial English Translation of Korean Office Action issued in KR10-2009-46404 issued on Nov. 19, 2010.
U.S. Appl. No. 12/473,607.
U.S. Appl. No. 12/126,202.
U.S. Appl. No. 12/877,720.
Chinese Office Action issued in CN 2008-10109176.5 on Nov. 15, 2011.
English Language Translation of Chinese Office Action issued in CN 2008-10109176.5 on Nov. 15, 2011.
Related U.S. Appl. No. 12/473,607 between Dec. 27, 2011 and Feb. 15, 2012.
Related U.S. Appl. No. 12/473,607 between Feb. 15, 2012 and Apr. 4, 2012.
Related U.S. Appl. No. 12/877,720 between Feb. 15, 2012 and Apr. 4, 2012.

* cited by examiner

SHEET OR FILM FORMING ROLL, SHEET OR FILM CASTING APPARATUS, AND MINIATURE PATTERN TRANSFERRING APPARATUS

TECHNICAL FIELD

The present invention relates to a sheet or film forming roll, a sheet or film casting apparatus, and a miniature pattern transferring apparatus, and particularly, to a sheet or film forming roll adapted for thermo-control to have roll surface temperatures differentiated in a roll circumferential direction.

BACKGROUND ART

As a sheet or film forming roll adapted for thermo-control to have roll surface temperatures differentiated in a roll circumferential direction, there is one disclosed in Japanese Patent Application Laid-Open Publication No. 2006-256159, which includes an inner cylindrical tube arranged to be irrotational, a rotative outer cylindrical tube arranged concentrically to the inner cylindrical tube, an annular medium flow path defined as a gap by and between an outer circumferential surface of the inner cylindrical tube and an inner circumferential surface of the outer cylindrical tube, a plurality of bulkhead members extending in the axial direction of the inner cylindrical tube to partition the annular medium flow path in the circumferential direction, respectively dividing the medium flow path into small medium flow paths, a plurality of slit-shaped medium flow inlets bored through the wall of the inner cylindrical tube along the axis of the inner cylindrical tube at different positions in the circumferential direction of the inner cylindrical tube, so that they each respectively communicate with one of the small medium flow paths, and a plurality of slit-shaped medium flow outlets bored through the wall of the inner cylindrical tube along the axis of the inner cylindrical tube at different positions in the circumferential direction of the inner cylindrical tube, so that they each respectively communicate with one of the small medium flow paths.

DISCLOSURE OF INVENTION

For such the sheet or film forming roll, the outer cylindrical tube (outer tube) needs to be a thin-wall structure having a small heat capacity, in order for roll surface temperatures to be defined to differentiate by roll-circumferentially divided thermo-control zones.

For the above-noted sheet or film forming roll, assuming its outer tube as a thin-wall structure having a small heat capacity, it does have applications such as to a sheet or film casting using a method of formation in which it is free of large pressing forces acting on the outer tube, such as a peering formation or formation by air chambers, but instead, in those cases in which the resin is pressed on the roll by a touch roll, as in a touch roll type, it may suffer from deformation of the outer tube, with sufficient pressing forces unavailable, failing to implement a right casting.

Further, in the above-noted sheet or film forming roll, the medium flow paths (heat medium chambers) to be given differentiated temperatures may be short-circuited in between, leaking heat medium, with a difficulty to implement an adequate individual temperature setting of respective medium flow paths.

The present invention has been devised in view of such issues, and it is an object thereof to provide a sheet or film forming roll adapted for thermo-control to have roll surface temperatures differentiated in a roll circumferential direction, allowing for applications such as to a touch roll type casting or miniature pattern transfer, and an adequate individual temperature setting of respective heat medium chambers.

According to the present invention, a sheet or film forming roll comprises a central rotational shaft rotatively supported by bearing members, stationary end plates respectively concentrically arranged to end portions of the central rotational shaft, a metallic thin-filmed outer tube supported by the stationary end plates at both ends thereof to be rotative concentrically to the central rotational shaft, a plurality of rolling rubber rolls each rotatively supported at both ends thereof by the stationary end plates and adapted for a sliding contact with an outer circumferential surface of the central rotational shaft and a sliding contact with an inner circumferential surface of the outer tube, and a plurality of heat medium chambers defined by outer circumferential surfaces of the rolling rubber rolls, the inner circumferential surface of the outer tube, and the outer circumferential surface of the central rotational shaft, the plurality of heat medium chambers being each respectively configured for individual conduction of heat medium.

BEST MODE FOR CARRYING OUT THE INVENTION

There will be described an embodiment of a sheet or film forming roll according to the present invention, with reference to FIG. 1 to FIG. 4.

Figure 1:
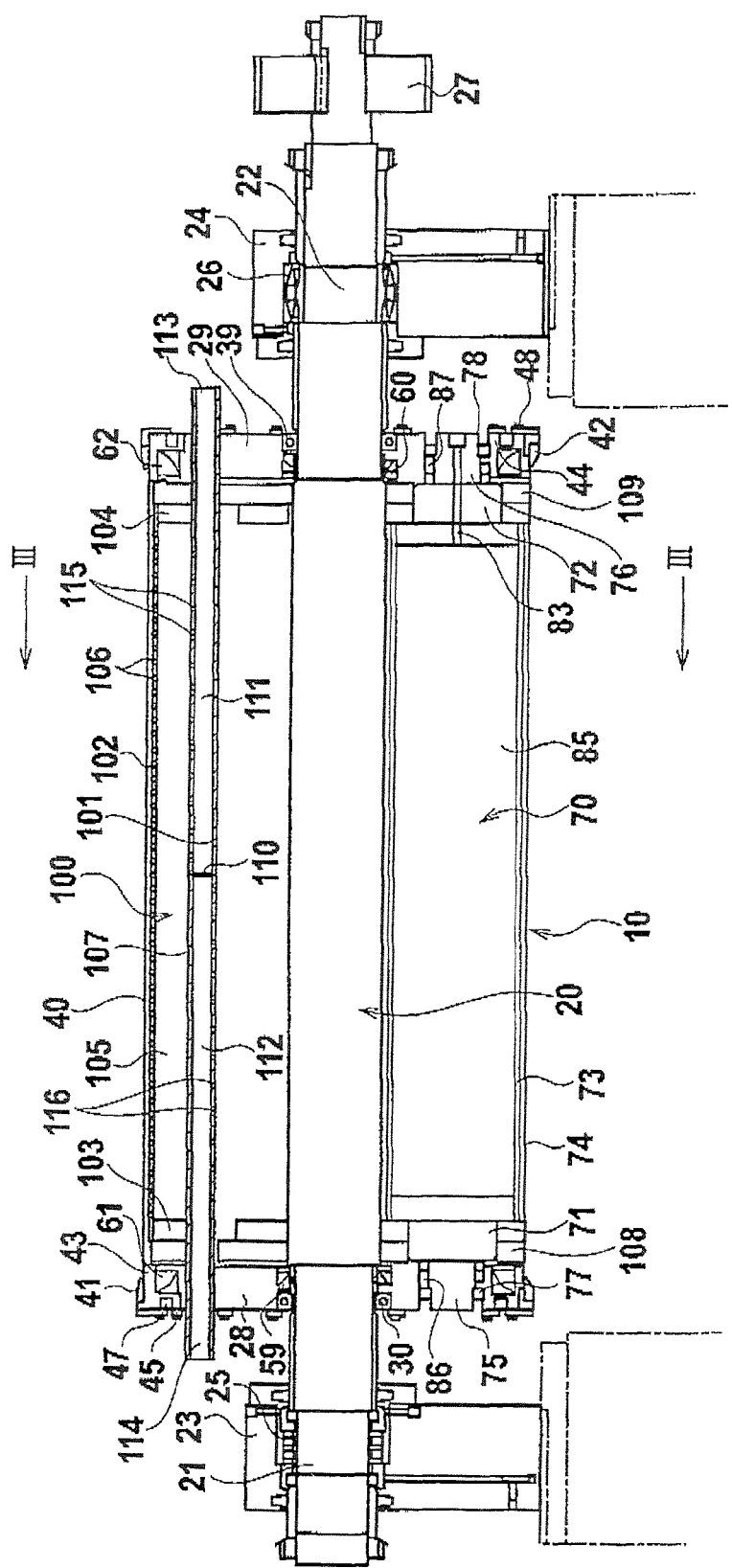
FIG. 1 This is a longitudinal sectional view illustrating an embodiment of a sheet or film forming roll according to the present invention.
Figure 2:
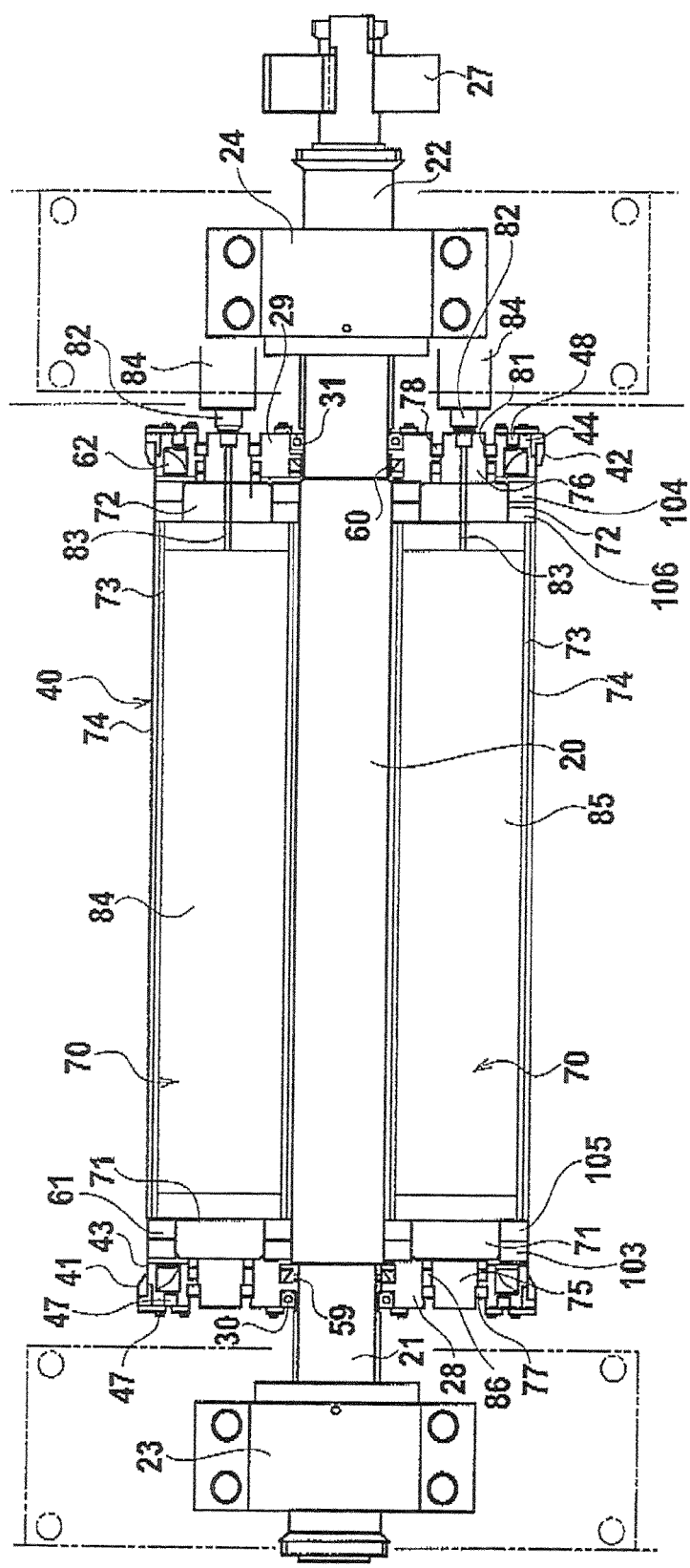
FIG. 2 This is a sectional plan view illustrating the embodiment of the sheet or film forming roll according to the present invention.
Figure 3:
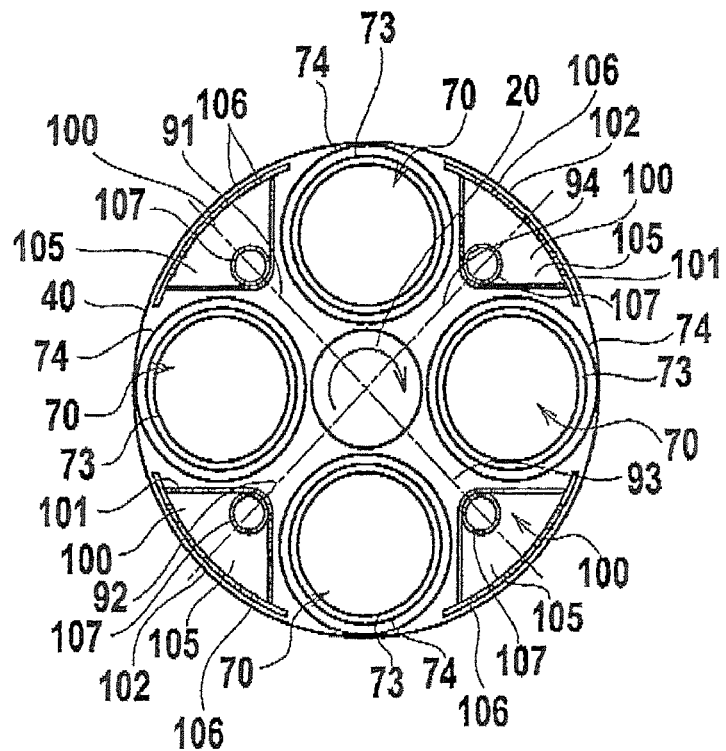
FIG. 3 This is a view of III-III section of FIG. 1.

As illustrated in FIG. 1 to FIG. 3, the sheet or film forming roll 10 includes a central rotational shaft 20, an outer tube (thin-wall sleeve) 40, four rolling rubber rolls 70, and four heat medium supply and discharge mechanisms 100.

The central rotational shaft 20 has end portions 21 and 22 rotatively supported by an operating side bearing portion 23 and a driving side bearing portion 24 of a film forming machine, through bearing members 25 and 26, respectively. At an end of the end portion 22 of the central rotational shall 20, there is a tinting pulley 27 fixed thereon to drive the central rotational shaft 20 for rotation. The timing pulley 27 is connected for drive by an unshown timing belt or the like to an electric motor (not shown), so it is drivable for rotation by the electric motor.

The central rotational shaft 20 has, at axially (horizontally in FIG. 1 and FIG. 2) spaced two locations, a driving side end plate 29 and an operating side end plate 28 of a disc form supported through ball bearings 31 and 30, respectively. The operating side end plate 28 and the driving side end plate 29 are irrotational stationary end plates fixedly connected by unshown connecting members or the like to the operating side bearing portion 23 and the driving side bearing portion 24, respectively, and are irrotatively concentrically arranged on the central rotational shaft 20. As used herein, the concentric arrangement refers to outer peripheral surfaces of the operating side bearing portion 23 and the driving side bearing portion 24 being concentric with the central rotational shaft 20.

The outer tube 40 is a metallic thin-filmed cylinder made of a stainless steel or the like, as an elastically deformable, flexible thin-wall structure. The outer tube 40 has at right and left end portions thereof annular end portion rigidizing members 43 and 44 fixedly attached thereto by annular hoop (bulge hoop) members 41 and 42, respectively. The annular end portion rigidizing members 43 and 44 are relatively supported on the operating side end plate 28 and the driving side end plate 29 by ball bearings 47 and 48 fixed by bearing fixing rings 45 and 46 to outer peripheral portions of the operating side end plate 28 and the driving side end plate 29, respectively. The outer tube 40 is thereby concentrically arranged to the central rotational shaft 20, and rotative about a center axis of the central rotational shaft 20.

Figure 4:
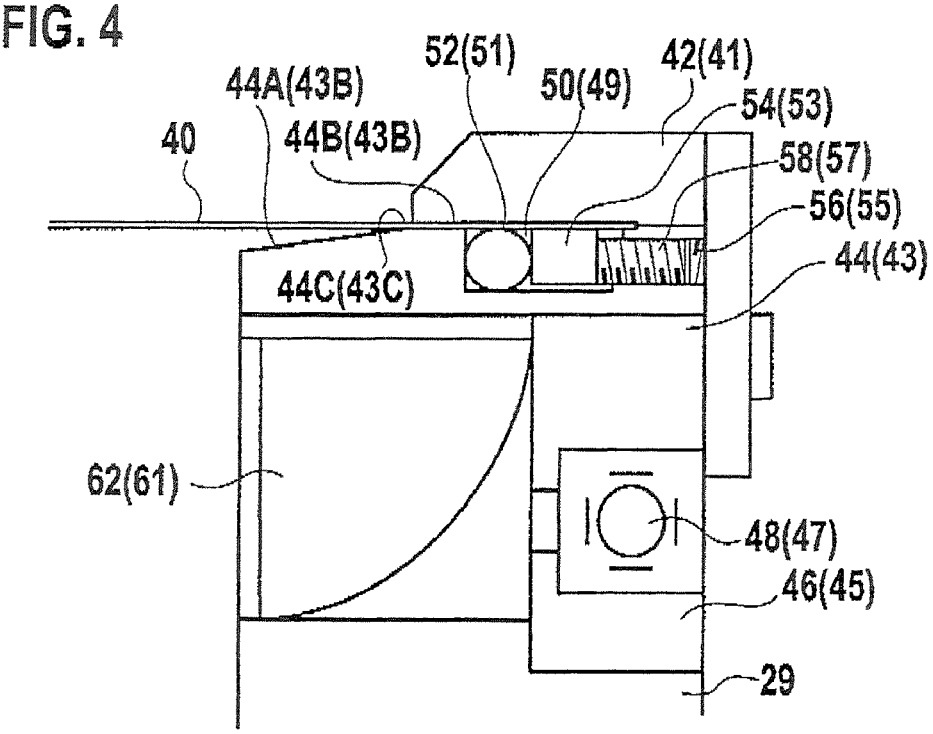
FIG. 4 This is an enlarged sectional view of an outer tube fixing portion of the sheet or film forming roll according to the present embodiment.

Description is now made into details of connection structures between outer tube 40 and end portion rigidizing members 43 and 44 using the hoop (bulge hoop) members 41 and 42, with reference made to FIG. 4. The connection structure between outer tube 40 and left-hand end portion rigidizing member 43 and the connection structure between outer tube 40 and right-hand end portion rigidizing member 43 are bilaterally symmetric and identical structures, so the right-hand connection structure is depicted in FIG. 4, where the left-hand connection structure is omitted, while corresponding parts are designated by reference characters for identification.

The end portion rigidizing members 43 and 44 are inserted at both axial ends of the outer tube 40 to fit inside the outer tube 40, respectively. There are wide recessed grooves (circumferential grooves) 49 and 50 in outer peripheral portions where the end portion rigidizing members 43 and 44 are fit in inner circumferential surfaces of the outer tube 40, respectively. The recessed grooves 49 and 50 have O-rings 51 and 52 made of a rubber-like elastomer, fit therein to apply thereto, respectively.

The recessed grooves 49 and 50 are configured as wide O-ring grooves having depths equivalent to or greater than line diameters of the O-rings 51 and 52 in free dimensional states (deeper than a typical specified value by 0.05 to 0.3 mm), and width dimensions sufficiently wider than the line diameters of the O-rings 51 and 52 (about 2 to 2.5 times line diameters), respectively. The free dimensional states refer to states of the O-rings 51 and 52 free of elastic deformations.

The recessed grooves 49 and 50 have metallic collar members 53 and 54 disposed adjacently to, widthwise of, the O-rings 51 and 52, respectively. The collar members 53 and 54 are divided into at least two to fit in the recessed grooves 49 and 50, and disposed adjacently to, at the outer sides with respect to the end portion rigidizing members 43 and 44 of the O-rings 51 and 52 (for the recessed groove 50 of the right-hand end portion rigidizing member 44, at the right side of the O-ring 52), so they are axially (horizontally) movable in the recessed grooves 49 and 50, respectively. The collar members 53 and 54 as applied to the recessed grooves 49 and 50 have outside diameters set to dimensions equivalent to or smaller than outside diameters of the end portion rigidizing members 43 and 44, respectively.

The end portion rigidizing members 43 and 44 have screw holes 55 and 56 pierced therethrough from end faces at the outsides of the end portion rigidizing members 43 and 44, opening in groove sidewalk of the recessed grooves 49 and 50, respectively. There are sets of screw holes 55 and 56 arranged along circumferences of the end portion rigidizing members 43 and 44, having their screw members 57 and 58 thread-engaged thereto. The screw members 57 and 58 are configured to abut at distal ends thereof on side faces of the collar members 53 and 54, pressing the collar members 53 and 54 against the O-rings 51 and 52 in dependence on screwed amounts, respectively.

The outer tube 40 has the hoop (bulge hoop) members 41 and 42 of metallic rigid structures fit on, for the application to, outer peripheries of both axial ends thereof (as parts thereof corresponding to the recessed grooves 49 and 50), respectively. The hoop members 41 and 42 are fit onto outer peripheries of the outer tube 40, to have the outer tube 40 suppressed from bulging to deform in diameter-enlarging directions, respectively.

In the course of application of the end portion rigidizing members 43 and 44, the O-rings 51 and 52 and the collar members 53 and 54 are applied to fit on the recessed grooves 49 and 50, and in a state where the screw members 57 and 58 are loosened (that is, in a sate where the collar members 53 and 54 have not been yet pressed against the O-rings 51 and 52, leaving the O-rings 51 and 52 as they are in their free dimensional states), and the hoop members 41 and 42 have not been yet applied as additional conditions, the end portion rigidizing members 43 and 44 are inserted into the outer tube 40 from openings at right and left axial ends of the outer tube 40.

At the time of this insertion, the O-rings 51 and 52 are in their free dimensional states, the recessed grooves 49 and 50 having their depths equivalent to or greater than line diameters of the O-rings 51 and 52 in free dimensional states, entireties of the O-rings 51 and 52 being accommodated in the recessed grooves 49 and 50, the O-rings 51 and 52 being kept from bulging outside the outer circumferential surfaces of the end portion rigidizing members 43 and 44, and the end portion rigidizing members 43 and 44 can be smoothly inserted with ease into the thin-wall outer tube 40 with low frictional resistances, without having the O-rings 51 and 52 pressed against inner circumferential surfaces of the outer tube 40. Further, it also is thereby avoidable for the O-rings 51 and 52 to be injured during insertion work.

In order for the insertion work to be further facilitated, the end portion rigidizing members 43 and 44 have tapered outer circumferential surfaces 43A and 44A reduced as they extend at their ends for insertion to the outer tube 40, in addition to R-chamfered connection parts 43C and 44C between the tapered outer circumferential surfaces 43A and 44A and straight outer circumferential surfaces 43B and 44B where the recessed grooves 49 and 50 are formed, respectively.

After completion of the above-noted insertion work, the hoop members 41 and 42 are fit to apply onto outer peripheries at both axial ends of the outer tube 40, respectively. After that the screw members 57 and 58 are screwed in, pressing the collar members 53 and 54 against the O-rings 51 and 52, causing the O-rings 51, and 52 to elasticity deform, respectively. The O-rings 51 and 52 are caused, in compressed states between the outer tube 40 and the end portion rigidizing members 43 and 44, to elastically deform in dependence on screwed amounts of the screw members 57 and 58, respectively. It is suppressed by the hoop members 41 and 42 for the outer tube 40 to bulgingly deform with repulsive forces due to elastic deformations of the O-rings 51 and 52.

By doing so, the outer tube 40 and the end portion rigidizing members 43 and 44 are coupled together for liquid-proof connections to be incapable of relative displacements, with frictional resistances developed between them by repulsive farces due to elastic deformations of the O-rings 51 and 52. Simultaneously therewith, the outer tube 40 and the hoop members 41 and 42 also are coupled together for connections to be incapable of relative displacements, with motional resistances developed between them by repulsive forces due to elastic deformations of the O-rings 51 and 52.

Such being the case, the O-rings 51 and 52 are elastically deformed under the condition that the outer tube 40 is suppressed from bulging to deform by the hoop members 41 and 42, whereby the outer tube 40 and the end portion rigidizing members 43 and 44 have liquid-proof connections with stabilized strengths, allowing for an increased pressure capacity with increased elastic deformation amounts of the O-rings 51 and 52, as well. The elastic deformation amounts of the O-rings 51 and 52 are freely settable to an arbitrary value by screwed amount adjustments of the screw members 57 and 58.

For this connection structure, the above-noted insertion work may be performed in a reverse way to thereby disassemble the outer tube 40 and the end portion rigidizing members 43 and 44 with ease, allowing for an excellent maintainability.

As illustrated in FIG. 1 to FIG. 3, the four roiling rubber rolls 70 have an identical structure, and are each respectively configured as a hollow cylinder including a metallic cylinder 73 suspended to bridge between aright or left shaft end member 71 or 72 and a left or right shaft end member 72 or 71, and integrated therewith, and a cylindrical rubber 74 mace of a rubber-like elastomer and spread over an outer periphery of the metallic cylinder 73.

The rolling rubber rolls 70 are each respectively supported rotatively about own center axis thereof by means of supporting shaft portions 75 and 76 formed on the shaft end members 71 and 72, from the operating side end plate 28 and the driving side end plate 29, through ball bearings 77 and 78.

The four rolling rubber rolls 70 are arranged to be equally spaced, at rotational angular intervals of 90 degrees, about the center axis of the central rotational shaft 20, with their cylindrical rubbers 74 brought into sliding contacts (pressure-contacts) on an outer circumferential surface of the central rotational shaft 20, and sliding contacts (pressure-contacts) on an inner circumferential surface of the outer tube 40.

By doing so, rotation of the central rotational shaft 20 is transmitted by frictional forces to the respective rolling rubber rolls 70, causing each rolling rubber roll 70 to revolve for rotation about own center axis. And, rotations of the respective rolling rubber rolls 70 are transmitted by frictional forces to the outer tube 40, causing the outer tube 40 to rotate about the center axis of the central rotational shaft 20.

It is noted that under an unloaded condition (a condition of the sheet or film forming roll 10 where the outer tube 40 is free of external forces acting thereon from outside such as by a touch roll), there may also be a setting for the rolling rubber rolls 70 to be non-contact on the central rotational shaft 20 or the outer tube 40, with small gaps in between.

As illustrated in FIG. 3, for the central rotational shaft 20 being motor-driven in a clockwise direction, each rolling rubber roll 70 rolls in a counterclockwise direction, and the outer tube 40 rotates in a counterclockwise direction.

For each rolling rubber roll 70, the shaft end member 72 is formed with a hydraulic pressure supply hole 83. A hydraulic pressure supplying means 84 outside the roll is connected by a rotary joint 82 to the hydraulic pressure supply hole 83, and the hydraulic pressure supply hole 83 is configured to introduce a hydraulic pressure from the hydraulic pressure supplying means 84 into a space 85 in the roll. That is, the rolling rubber rolls 70 are each configured, as a hollow roll, for a hydraulic pressure supply by a rotary joint 82 to an internal space of the roll, and adapted for a variable setting of pressure in the roll-internal space.

By that, even while rotating (rolling), each rolling rubber roll 70 is enabled to have an inner pressure of the roll-internal space 85 set in a variable manner by hydraulic pressure, so the rolling rubber roll 70's metallic cylinder 73 and cylindrical rubber 74 are swelled like a drum by the inner pressure of the roll-internal space 85. In accordance therewith, also the outer tube 40 is bulged like a drum, whereby the outer tube 40 is given a crowning in a variable manner.

There are mechanical seal members 59 and 60 applied between the central rotational shaft 20 and the operating side end plate 28 and the driving side end plate 29, respectively, and mechanical seal members 61 and 62 applied between the operating side end plate 28 and the driving side end plate 29 and the end portion rigidizing members 43 and 44, respectively. Further, there are mechanical seal members applied between the operating side end plate 28 and the driving side end plate 29 and the supporting shaft portions 75 and 76, respectively. By that, an outer tube internal space enclosed by the operating side end plate 28, the driving side end plate 29, the end portion rigidizing members 43 and 44, and the outer lube 40 is configured as a liquid-proof structure in a form that the central rotational shaft 20 is provided through a central portion thereof. The annular space of liquid-proof structure between the central rotational shaft 20 and the outer tube 40 is divided by the four rolling rubber rolls 70 into four in circumferential directions of the central rotational shaft 20 and the outer tube 40, having a first heat medium chamber 91, a second heat medium chamber 92, a third heat medium chamber 93, and a fourth heat medium chamber 94 defined between the rolling rubber rolls 70 (refer to FIG. 3).

The four heat medium supply and discharge mechanisms 100 are mutually identical in structure, and fixedly arranged one-to-one to the first to fourth heat medium chamber 91, 92, 93, and 94. The heat medium supply and discharge mechanisms 100 each respectively include a channel-shaped member 101 having a C-shaped cross section, and an arcuate planer member 102 welded to the channel-shaped member 101 and contiguous to an inner circumferential surface of the outer tube 40. The channel-shaped member 101 and the arcuate planer member 102 are extended over axial length of the outer tube 40, the arcuate planer member 102 having a multiplicity of heat medium spouting holes 106 distributed substantially over an entire region thereof. In other words, multiple heat medium spouting holes 106 are arranged substantially over an entire region of axial length of the outer tube 40.

For each heat medium supply and discharge mechanism 100, both ends of a connected combination of the channel-shaped member 101 and the arcuate planer member 102 are fixed to end plates 103 and 104. The end plates 103 and 104 shut both ends of the connected combination of the channel-shaped member 101 and the arcuate planer member 102, to have a heat medium supply chamber 105 defined inside the connected combination for each heat medium supply and discharge mechanism 100.

Each heat medium supply and discharge mechanism 100 is provided with a heat medium supply and discharge pipe 107. The heat medium supply and discharge pipe 107 is fixedly arranged inside the heat medium supply chamber 105, with both ends protruding outside the roll through end plates 108 and 109 and the operating side end plate 28 and the driving side end plate 29. The heat medium supply and discharge pipe 107 is partitioned at an axially central part thereof by a bulkhead plate 110, defining a heat medium supply path 111 at the side of driving side end plats 29 and a heat medium discharge path 112 at the side of operating side end plate 28. And, the heat medium supply and discharge pipe 107 has an end part thereof at the side of driving side end plate 29 as a heat medium inlet 113, and an end part thereof at the side of operating side end plate 28 as a heat medium outlet 114.

The heat medium supply and discharge pipe 107 has at the portion of heat medium supply path 111 a multiplicity of heat medium supply holes 115 opened therethrough toward the heat medium supply chamber 105. The heat medium supply and discharge pipe 107 has at the portion of heat medium discharge path 112 a multiplicity of heat medium discharge holes 116 opened therethrough, and through the channel-shaped member 101, to the outside of heat medium supply chamber 105 (the first to the fourth heat medium chamber 91, 92, 93, 94).

By this structure, for each of the first to fourth heat medium chambers 91, 92, 93, and 94, flux of heat medium is admitted to inflow from the heat medium inlet 113 to the heat medium supply path 111, strike therefrom through heat medium supply holes 115 into the heat medium supply chamber 105, spout from heat medium spouting holes 106 toward an inner circumferential surface of the outer tube 40, flow outside the heat medium supply chamber 105, and strike through heat medium discharge holes 116 into the heat medium discharge path 112, to be discharged outside from the heat medium outlet 114. That is, heat medium is individually independently conducted for each heat medium chamber of the first to fourth heat medium chambers 91, 92, 93, and 94.

This permits temperature of heat medium being supplied to a respective heat medium chamber of the first to fourth heat medium chambers 91, 92, 93, and 94 to be individually set, thereby allowing surface temperatures of the outer tube 40 to be individually set for each belt-like zone corresponding to a respective one of the first to fourth heat medium chambers 91, 92, 93, and 94. In other words, the outer tube 40 is allowed to have surface temperatures individually set for each of the first to the fourth heat medium chamber 91, 92, 93, 94, as thermo-control zones set off in a roll rotational direction.

The first to fourth heat medium chambers 91, 92, 93, and 94 are defined by the rolling rubber rolls 70 with the cylindrical rubbers 74 contacting on the central rotational shaft 20 and the outer tube 40, allowing for sealing effects to be available, affording for the first to fourth heat medium chambers 91, 92, 93, and 94 to be free of, or avoid so far as possible, short-circuited leakage of heat medium between heat medium chambers.

This allows for ah accurate high-precision setting of temperatures of thermo-control zones to be set by the first to fourth heat medium chambers 91, 92, 93, and 94, as well as surface temperatures of the outer tube 40 by the thermo-control zones.

Further, at each of the first to the fourth heat medium chamber 91, 92, 93, 94, flux of thermo-controlled heat medium spouts toward an inner circumferential surface of the outer tube 40 from multiple heat medium spouting holes 106 distributed substantially over an entire region of the arcuate planer member 102 arranged substantially over an entire region of axial length of the outer tube 40, whereby surface temperatures of the outer tube 40 can be set substantially uniformly for each of the thermo-control zones by the first to fourth heat medium chambers 91, 92, 93, and 94.

This permits, for each thermo-control zone, the surface temperature of the outer tube 40 to be even without gradients in the roll axial direction.

Even with the outer tube 40 configured as a thin-wall structure having a small heat capacity in order for surface temperatures at respective thermo-control zones of the outer tube 40 to be defined to differentiate on the seat or film forming roll 10 while rotating, the outer tube 40 is backed up by the rolling rubber rolls 70 in a metal-backing method, affording in application to a touch roll type sheet or film casting or miniature pattern transfer to homologize locations of touch rolls to be arranged to locations of the rolling rubber rolls 70 disposed in position, thereby permitting the outer tube 40 to be suppressed from being deformed, securing sufficient pressing forces.

This allows in application to a touch roll type sheet or film casting or miniature pattern transfer for surface temperatures on the outer tube 40 of the seat or film forming roll 10 while rotating to be differentiated by thermo-control zones set off in a roll circumferential direction.

Figure 5:
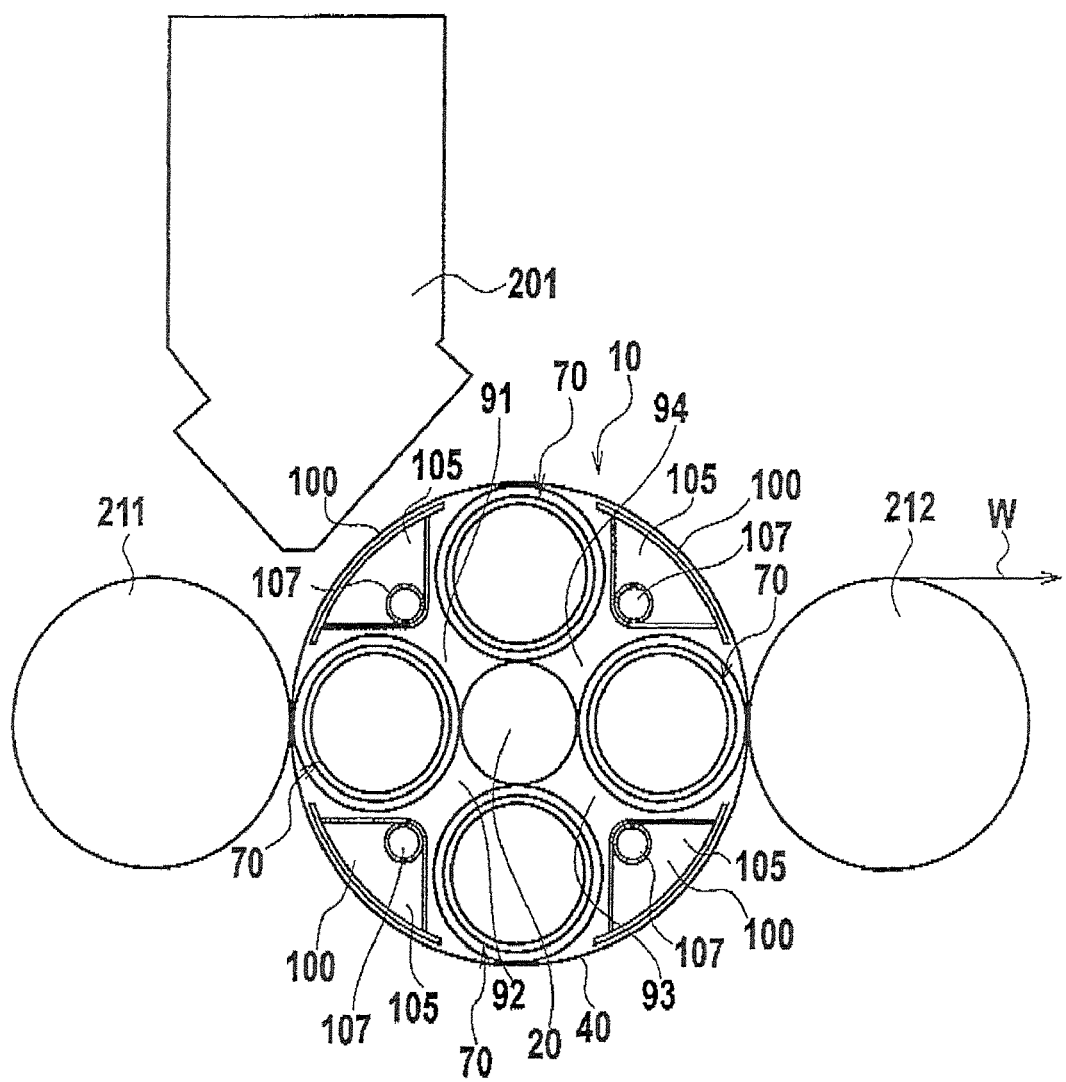
FIG. 5 This is a view illustrating a mode of embodiment of a sheet or film casting apparatus of a touch roll type including the sheet or film forming roll according to the present embodiment adapted as a main roll thereof.

FIG. 5 illustrates a mode of embodiment of a sheet or film casting apparatus of a touch roll type including the sheet or film forming roll 10 according to the above-noted embodiment adapted as a main roll thereof.

The sheet or film casting apparatus according to this mode of embodiment includes touch rolls 211 and 212 arranged in positions where they can abut through the outer tube 40 on respective ones of horizontally arrayed two rolling rubber rolls 70 having rotational phase positions different by 180 degrees from each other about a rotational center axis of the sheet or film forming roll 10.

Molten thermoplastic resin from a T-die 201 is downwardly supplied between the sheet or film forming roll 10 and the touch roll 211.

In this case, an arranged position of the touch roll 211 constitutes a contact start position of thermoplastic resin to the sheet or film forming roll 10, the contact start position residing on a boundary portion between the first heat medium chamber 91 and the second heat medium chamber 92. An arranged position of the touch roll 212 constitutes a peel-off position of thermoplastic resin from the sheet or film forming roll 10, the peel-off position residing on a boundary portion between the third heat medium chamber 93 and the fourth heat medium chamber 94.

As the sheet or film forming roll 10 rotates, thermoplastic resin contacted with a roll surface of the sheet or film forming roll 10 is moved from the contact start position toward the peel-off position, while passing in order a thermo-control zone by the second heat medium chamber 92 and a thermo-control zone by the third heat medium chamber 93, where it is cooled and solidified.

In this mode of embodiment the sheet or film forming roll 10 is put under a temperature control, where flux of heat medium to be supplied to the heat medium supply chamber 105 of the first heat medium chamber 91 has a highest temperature, flux of heat medium to be supplied to heat medium supply chamber 105 has lower temperatures as it addresses the second heat medium chamber 92 and in turn the third heat medium chamber 93, and flux of heat medium to be supplied to the heat medium supply chamber 105 of the fourth heat medium chamber 94 has a temperature a little higher than the temperature of flux of heat medium to be supplied to the heat medium supply chamber 105 of the third heat medium chamber 93.

Surface temperatures of the outer tube 40 become substantially equivalent to temperatures of flux of heat medium supplied to heat medium supply chambers 105 of the first to fourth heat medium chambers 91 to 94 at thermo-control zones set by the first to fourth heat medium chambers 91, 92, 93, and 94, respectively.

Surface temperatures of the touch roll 211 are substantially equivalent to surface temperatures of the outer tube 40 at the thermo-control zone by the second heat medium chamber 92, and surface temperatures of the touch roll 212 are substantially equivalent to surface temperatures of the outer tube 40 at the thermo-control zone by the third heat medium chamber 93, as they are so thermo-controlled.

For instance, assuming molten resin outflowing from the T-die 201 as having a temperature of 270 degrees-C., there are temperatures set to 160 degrees-C. for flux of heat medium to be supplied to the heat medium supply chamber 105 of the first heat medium chamber 91, 130 degrees-C. for flux of heat medium to be supplied to the heat medium supply chamber 105 of the second heat medium chamber 92, 80 degrees-C. for flux of heat medium to be supplied to the heat medium supply chamber 105 of the third heat medium chamber 93, and about 100 degrees-C. for flux of heat medium to be supplied to the heat medium supply chamber 105 of the fourth heat medium chamber 94.

This permits temperatures of a region of roll surface at the contact start position of molten resin outflowing from the T-die 201 to the sheet or film forming roll 10, to be higher than the case of a main roll having no temperature differences in the roll circumferential direction, allowing for an adhesiveness between resin and roll surface (surface of the outer tube 40) to be sufficiently secured.

And, it permits temperatures of a region of roll surface in a vicinity of the peel-off position for a peel-off of a cast resin (as a sheet or film W) from the sheet or film forming roll 10, to be lower than the case of a main roll having no temperature differences in the roll circumferential direction. This allows for a secured surface nature of resin, while permitting the resin to swiftly pass over a region of roll surface near the crystallization temperature, allowing for a smooth peel-off of resin from the roll surface. With the foregoing effects in combination, casting a high-quality sheet or film W is implemented.

Figure 6:
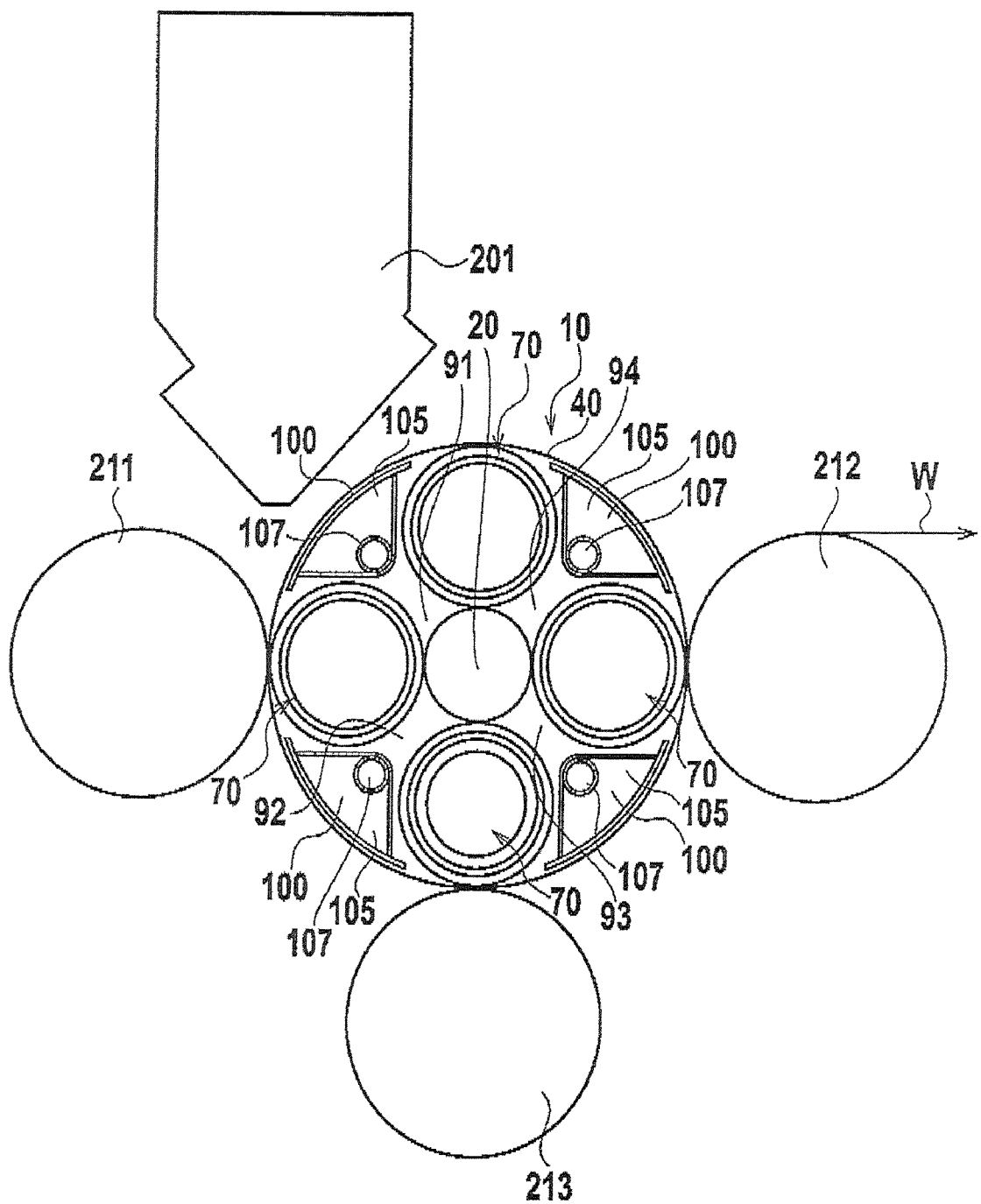
FIG. 6 This is a view illustrating another mode of embodiment of a sheet or film casting apparatus of a touch roll type including the sheet or film forming roll according to the present embodiment adapted as a main roll thereof.

FIG. 6 is another mode of embodiment of a sheet or film casting apparatus of a touch roll type including the sheet or film forming roll 10 according to the above-noted embodiment adapted as a main roll thereof, which has, besides touch rolls 211 and 212, another touch roll 213 that is arranged in a position where it can abut, through the outer tube 40, on a rolling rubber roll 70 residing in a boundary portion between the second heat medium chamber 92 and the third heat medium chamber 93.

In this case, roll surface temperatures of the sheet or film forming roll 10 as well as temperatures of a region of roll surface of the touch roll 211 at the contact start position may be identical to those in the mode of embodiment illustrated in FIG. 5, while surface temperatures of the touch roll 213 are substantially equivalent to surface temperatures of the outer tube 40 at the thermo-control zone of the third heat medium chamber 93, and surface temperatures of a region of roll surface of the touch roll 212 at the peel-off position are lower than surface temperatures of the outer tube 40 at the thermo-control zone of the third heat medium chamber 93, as they are so set. For instance, assuming flux of heat medium supplied to the heat medium supply chamber 105 of the third heat medium chamber 93 as having a temperature of 80 degrees-C., roll surface temperatures of the touch roll 212 are set about 40 degrees-C.

This affords to reduce temperatures of resin to be peeled off from the sheet or film forming roll 10, permitting a sufficient cooling of resin to be done in a casting process, allowing for a still smoother peel-off of resin from the roll surface.

Figure 7:
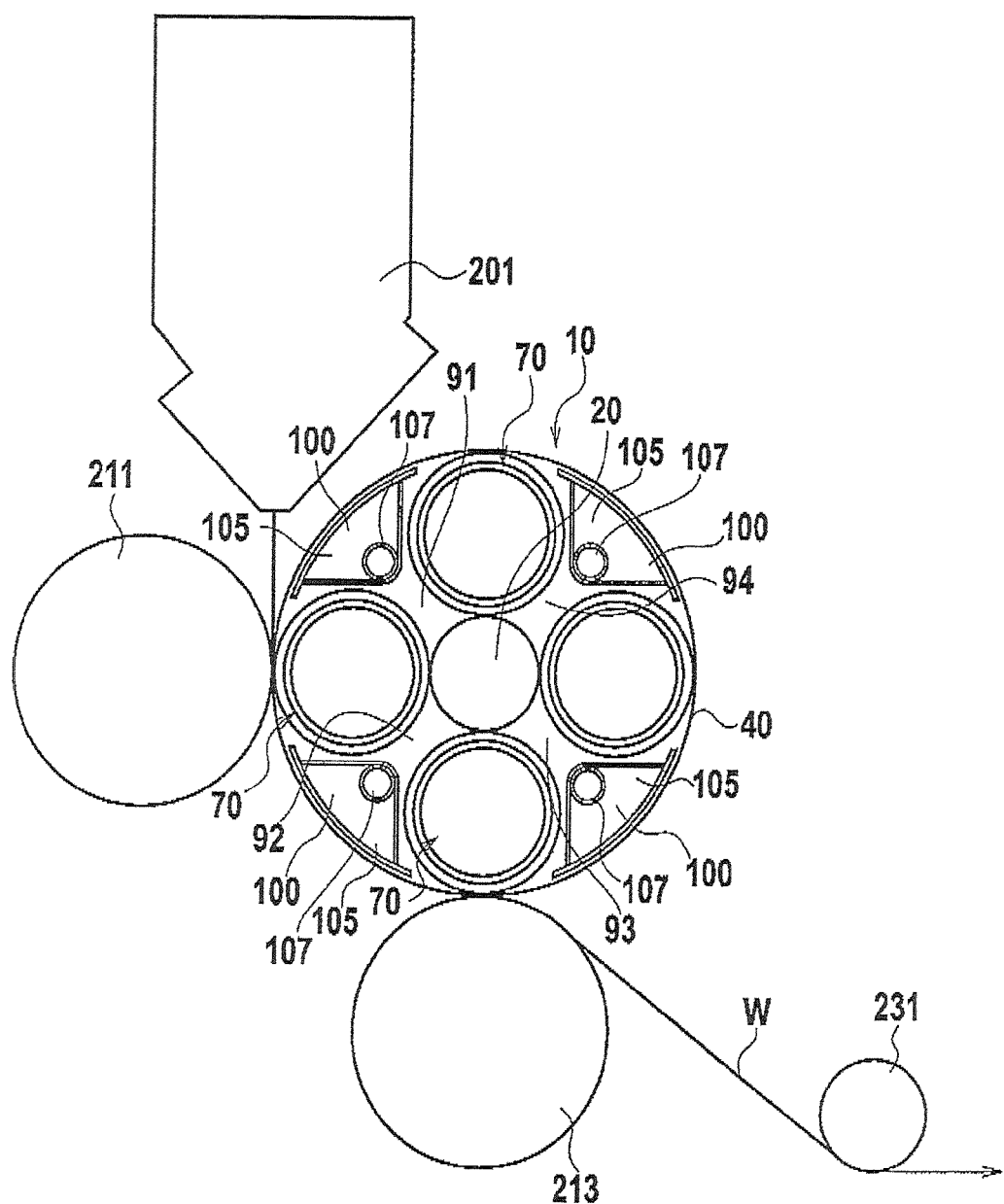
FIG. 7 This is a view illustrating another mode of embodiment of a sheet or film casting apparatus of a touch roll type including the sheet or film forming roll according to the present embodiment adapted as a main roll thereof.

FIG. 7 is still another mode of embodiment of a sheet or film casting apparatus of a touch roll type including the sheet or film forming roll 10 according to the above-noted embodiment adapted as a main roll thereof, which has touch rolls 211 and 213 respectively arranged in correspondence to horizontally and vertically arrayed two roiling rubber rolls 70 in rotational phase positions different by 90 degrees from each other about a rotational center axis of the sheet or film forming roll 10.

In this case, the contact start position is identical to the above-noted mode of embodiment, but instead, an arranged position of the touch roll 213 constitutes a peel-off position of thermoplastic resin from the sheet or film forming roll 10, the peel-off position residing on a boundary portion between the second heat medium chamber 92 and the third heat medium chamber 93.

In this mode of embodiment, the sheet or film forming roll 10 is put under a temperature control, where flux of heat medium to be supplied to the heat medium supply chamber 105 of the first heat medium chamber 91 has a highest temperature, and flux of heat medium to be supplied to heat medium supply chamber 105 has lower temperatures as it addresses the second heat medium chamber 92 and in turn the third heat medium chamber 93, while the fourth heat medium chamber 94 does not undergo any specific temperature control.

For instance, assuming molten resin outflowing from the T-die 201 as having a temperature of 270 degrees-C., there are temperatures set to 130 degrees-C. for flux of heat medium to be supplied to the heat medium supply chamber 105 of the first heat medium chamber 91, 90 degrees-C. for flux of heat medium to be supplied to the heat medium supply chamber 105 of the second heat medium chamber 92, 40 degrees-C. for flux of heat medium to be supplied to the heat medium supply chamber 105 of the third heat medium chamber 93, 90 degrees-C. for a roll surface of the touch roll 211, and about 40 degrees-C. for a roll surface of the touch roll 213.

In this mode of embodiment, the cooling of resin is performed more rapidly than the before-mentioned mode of embodiment. It therefore is adaptive to a casting of sheet or film of a thermoplastic resin suitable for a rapid cooling.

A sheet or film W peeled off from the sheet or film forming roll 10 is guided by a guide roller 231 to move to the next process.

Figure 8:
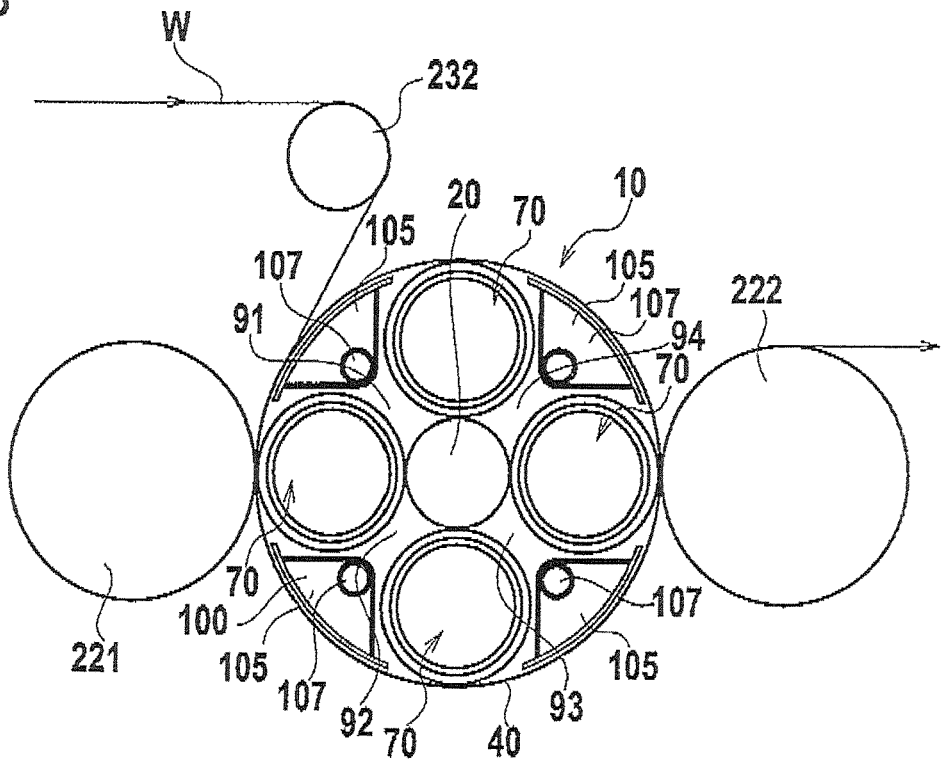
FIG. 8 This is a view illustrating a mode of embodiment of a miniature pattern transferring apparatus including the sheet or film forming roll according to the present embodiment adapted as a main roll thereof.

FIG. 8 illustrates a mode of embodiment of a miniature pattern transferring apparatus including the sheet or film forming roll 10 according to the above-noted embodiment adapted as a main roll thereof.

The miniature pattern transferring apparatus is adapted for reheating a sheet or film W made of a thermoplastic resin to transfer a miniature pattern such as an emboss for impression onto a surface of the sheet or film W. Therefore, in the sheet or film forming roll 10 applied to the miniature pattern transferring apparatus, a surface of the outer tube 40 has formed therein a complementary miniature pattern of the miniature pattern to be transferred to the sheet or film W.

The miniature pattern transferring apparatus according to this mode of embodiment includes touch rolls 221 and 222 arranged in positions where they can abut through the outer tube 40 on respective ones of horizontally arrayed two rolling rubber rolls 70 having rotational phase positions different by 180 degrees from each other about a rotational center axis of the sheet or film forming roll 10.

A sheet or film W is guided by a guide roll 232 to feed onto a roll surface of the sheet or film forming roll 10, and is fed in the manner of being wound on a roll surface of the sheet or film forming roll 10, while an arranged position of the touch roll 221 constitutes a transfer start position, the transfer start position residing on a boundary portion between the first heat medium chamber 91 and the second heat medium chamber 92. An arranged position of the touch roll 222 constitutes a peel-off position of thermoplastic resin from the sheet or film forming roll 10, the peel-off position residing on a boundary portion between the third heat medium chamber 93 and the fourth heat medium chamber 94.

In this mode of embodiment, the sheet or film forming roll 10 is put under a temperature control, where flux of heat medium to be supplied to the heat medium supply chamber 105 of the first heat medium chamber 91 has a highest temperature, flux of heat medium to be supplied to heat medium supply chamber 105 has lower temperatures as it addresses the second heat medium chamber 92 and in turn the third heat medium chamber 93, and flux of heat medium to be supplied to the heat medium supply chamber 105 of the fourth heat medium chamber 94 has a temperature a little higher than the temperature of flux of heat medium to be supplied to the heat medium supply chamber 105 of the third heat medium chamber 93.

Surface temperatures of the outer tube 40 become substantially equivalent to temperatures of flux of heat medium supplied to heat medium supply chambers 105 of the first to fourth heat medium chambers 91 to 94 at thermo-control zones set by the first to fourth heat medium chambers 91, 92, 93, and 94, respectively.

Surface temperatures of the touch roll 221 are substantially equivalent to surface temperatures of the outer tube 40 at the thermo-control zone by the second heat medium chamber 92, and surface temperatures of the touch roll 222 are substantially equivalent to surface temperatures of the outer tube 40 at the thermo-control zone by the third heat medium chamber 93, as they are so thermo-controlled.

For instance, there are temperatures set to 160 degrees-C. for flux of heat medium to be supplied to the heat medium supply chamber 105 of the first heat medium chamber 91, 130 degrees-C. for flux of heat medium to be supplied to the heat medium supply chamber 105 of the second heat medium chamber 92, 80 degrees-C. for flux of heat medium to be supplied to the heat medium supply chamber 105 of the third heat medium chamber 93, and about 100 degrees-C. for flux of heat medium to be supplied to the heat medium supply chamber 105 of the fourth heat medium chamber 94.

By that, a sheet or film W as guided by the guide roll 232 and fed onto a roll surface of the sheet or film forming roll 10 is preheated by the high-temperature thermo-control zone set by the first heat medium chamber 91, while it moves from a contact start position on the roll surface of the sheet or film forming roll 10 to the transfer start position. By the preheating, the sheet or film W has a temperature equal to or greater than a glass transition temperature at the transfer start position. The sheet or film W is pressed at the transfer start position by the touch roll 221 against the roll surface of the sheet or film forming roll 10, whereby it has a miniature pattern of the roll surface transferred thereto. Thereafter, being wound on the roll surface of the sheet or film forming roll 10, the sheet or film W moves toward the peel-off position, as the sheet or film forming roll 10 rotates, while passing the thermo-control zone by the second heat medium chamber 92 and in turn the thermo-control zone by the third heat medium chamber 93, whereby it is cooled below the glass transition temperature.

This permits temperatures of a region of roll surface in front of the transfer start position, i.e. temperatures of the high-temperature thermo-control zone set by the preheating first heat medium chamber 91, to be higher than the case of a main roll having no temperature differences in the roll circumferential direction, affording to have temperatures of the sheet or film W sufficiently raised above the glass transition temperature, allowing for a sufficiently accurate transfer of miniature pattern thereafter.

It permits temperatures of a region of roll surface near the peel-off position, where the sheet or film W having the miniature pattern transferred thereto is to be peeled off from the sheet or film forming roll 10, to be lower than the case of a main roll having no temperature differences in the roll circumferential direction, thereby affording to sufficiently cool the sheet or film W, allowing for the miniature pattern transferred to the sheet or film W to be sufficiently hardened and fixed, before peeling off the sheet or film W from the roll surface. With the foregoing effects in combination, an ensured high-precision transfer of miniature pattern is implemented, allowing for provision of a sheet or film W with a high-quality miniature pattern transferred thereto.

Figure 9:
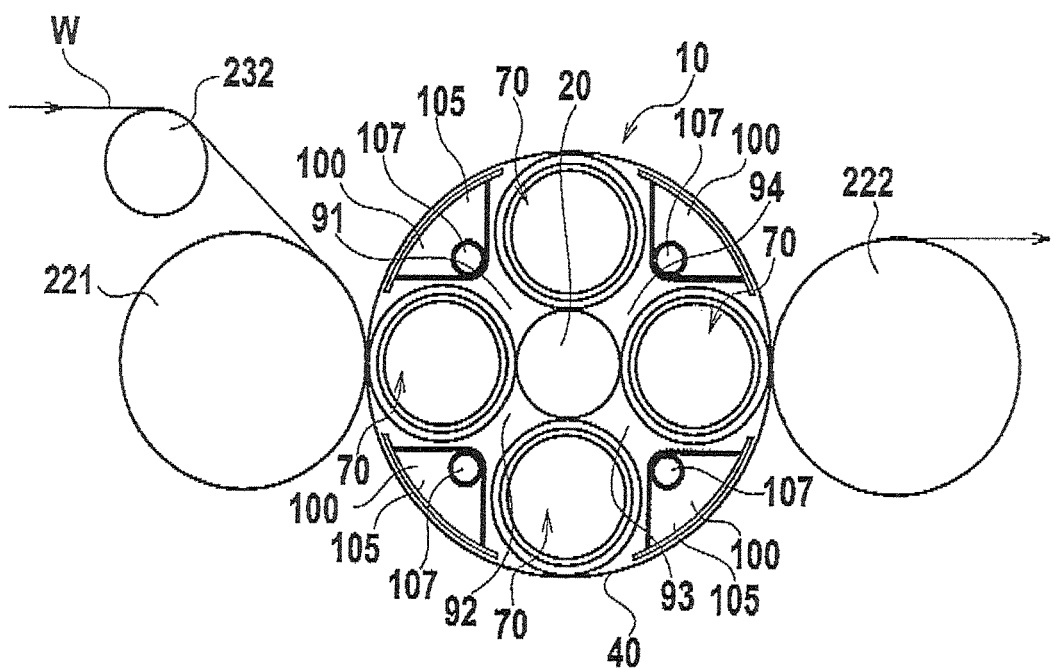
FIG. 9 This is a view illustrating another mode of embodiment of a miniature pattern transferring apparatus including the sheet or film forming roll according to the present embodiment adapted as a main roll thereof.

FIG. 9 illustrates another mode of embodiment of a miniature pattern transferring apparatus including the sheet or film forming roll 10 according to the above-noted embodiment adapted as a main roll thereof.

In this mode of embodiment, a sheet or film W is guided by a guide roll 232 to feed to a transfer start position by a touch roll 221. This mode of embodiment is suitable for, among others, a miniature pattern transfer in a process that does not need any substantial preheating, or a miniature pattern transfer to a thermoplastic resin that has a low glass transition temperature.

Figure 10:
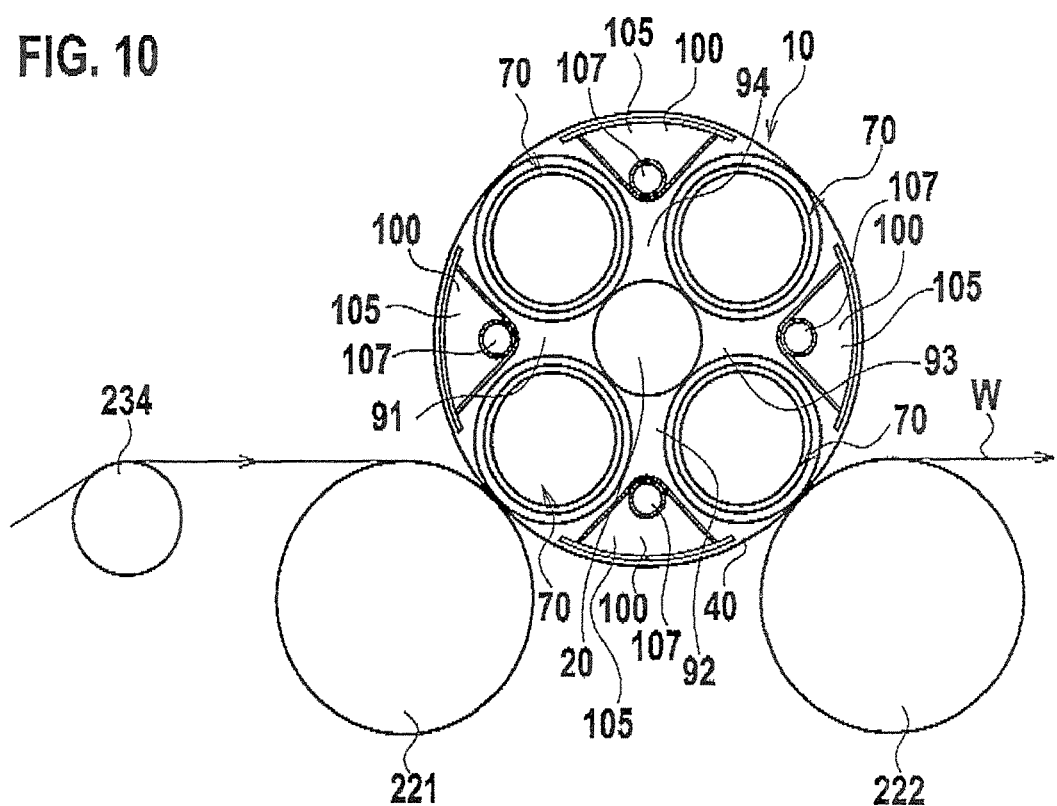
FIG. 10 This is a view illustrating another mode of embodiment of a miniature pattern transferring apparatus including the sheet or film forming roll according to the present embodiment adapted as a main roll thereof.

FIG. 10 illustrates another mode of embodiment of a miniature pattern transferring apparatus including the sheet or film forming roll 10 according to the above-noted embodiment adapted as a main roll thereof.

This mode of embodiment has touch rolls 221 and 252 arranged in positions where they can abut through the outer tube 40 on respective ones of two rolling rubber rolls 70 in rotational phase positions different by 90 degrees from each other about a rotational center axis of the sheet or film forming roll 10.

A sheet or film W is guided by a guide roll 234 and fed to a transfer start position by the touch roll 221, and is peeled off from the sheet or film forming roll 10 at a peel-off position by the touch roll 222. The transfer start position resides on a boundary portion between the first heat medium chamber 91 and the second heat medium chamber 92, and the peel-off position resides on a boundary portion between the second heat medium chamber 92 and the third heat medium chamber 93.

In this mode of embodiment also, the sheet or film forming roll 10 is put under a temperature control, where flux of heat medium to be supplied to the heat medium supply chamber 105 of the first heat medium chamber 91 has a highest temperature, flux of heat medium to be supplied to heat medium supply chamber 105 has lower temperatures as it addresses the second heat medium chamber 92 and in turn the third heat medium chamber 93, and flux of heat medium to be supplied to the heat medium supply chamber 105 of the fourth heat medium chamber 94 has a temperature a little higher than the temperature of flux of heat medium to be supplied to the heat medium supply chamber 105 of the third heat medium chamber 93. Further, surface temperatures of the touch roll 221 are substantially equivalent to surface temperatures of the outer tube 40 at the thermo-control zone by the second heat medium chamber 92, and surface temperatures of the touch roll 222 are substantially equivalent to surface temperatures of the outer tube 40 at the thermo-control zone by the third heat medium chamber 93, as they are so thermo-controlled.

This mode of embodiment is suitable for a high-speed miniature pattern transfer in a process that does not need any substantial preheating.

Figure 11:
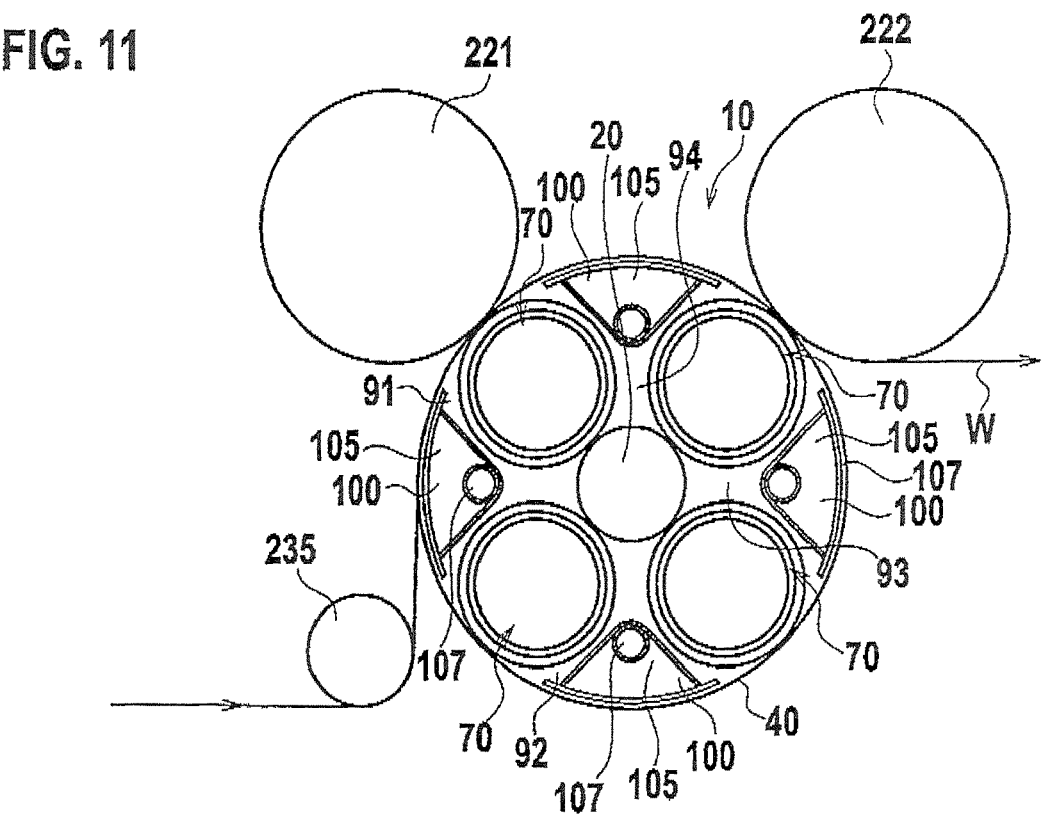
FIG. 11 This is a view illustrating another mode of embodiment of a miniature pattern transferring apparatus including the sheet or film forming roll according to the present embodiment adapted as a main roll thereof.

FIG. 11 illustrates another mode of embodiment of a miniature pattern transferring apparatus including the sheet or film forming roll 10 according to the above-noted embodiment adapted as a main roll thereof.

In this mode of embodiment the sheet or film forming roll 10 is rotated clockwise, unlike the before-mentioned modes embodiment. It has touch rolls 221 and 222 arranged in positions where they can abut through the outer tube 40 on respective ones of two rolling rubber rolls 70 in rotational phase positions different by 90 degrees from each other about a rotational center axis of the sheet or film forming roll 10.

A sheet or film W is guided by a guide roll 235 to feed onto a roll surface of the sheet or film forming roll 10, and is fed in the manner of being wound on a roll surface of the sheet or film forming roll 10, while an arranged position of the touch roll 221 constitutes a transfer start position, the transfer start position residing on a boundary portion between the first heat medium chamber 91 and the fourth heat medium chamber 94. An arranged position of the touch roll 222 constitutes a peel-off position of thermoplastic resin from the sheet or film forming roll 10, the peel-off position residing on a boundary portion between the fourth heat medium chamber 94 and the third heat medium chamber 93.

In this mode of embodiment, the sheet or film forming roll 10 is put under a temperature control, where flux of heat medium to be supplied to the heat medium supply chamber 105 of the first heat medium chamber 91 has a highest temperature, flux of heat medium to be supplied to heat medium supply chamber 105 has lower temperatures as it addresses the fourth heat medium chamber 94 and in turn the third heat medium chamber 93, and flux of heat medium to be supplied to the heat medium supply chamber 105 of the second heat medium chamber 92 has a temperature a little higher than the temperature of flux of heat medium to be supplied to the heat medium supply chamber 105 of the third heat medium chamber 93. Further, surface temperatures of the touch roll 221 are substantially equivalent to surface temperatures of the outer tube 40 at the thermo-control zone by the fourth heat medium chamber 94, and surface temperatures of the touch roll 222 are substantially equivalent to surface temperatures of the outer tube 40 at the thermo-control zone by the third heat medium chamber 93, as they are so thermo-controlled.

This mode of embodiment also has equivalent functions and effects to the mode of embodiment illustrated in FIG. 8.

There will be described another embodiment of a sheet or film forming roll according to the present invention, with reference to FIG. 12 and FIG. 13. It is noted that in FIG. 12 and FIG. 13, those parts corresponding to FIG. 1 to FIG. 3 are designated at the same reference characters as the reference characters in FIG. 1 to FIG. 3, to eliminate redundant description.

This embodiment is adapted for a forced rotational driving of an outer tube 40 as well as of a central rotational shaft 20. It has external gears 121 and 122 formed as outer tube rotating drive members on respective ones of hoop members 41 and 42 at both horizontal ends (both axial ends) of the outer tube 40. Outside the outer tube 40, there is a rotative gear shaft 123 provided in parallel with the central rotational shaft 20. The gear shaft 123 has fixed thereon drive gears 124 and 125 meshing with the external gears 121 and 122, respectively.

The gear shaft 123 has a timing pulley 126 fixed thereon. There is an endless timing belt 131 applied over timing pulleys 126, 27, and 130 and a timing pulley 129 fixed to an output shaft 128 of an electric motor 127.

The outer tube 40 is thereby driven to rotate in synchronism with rotation of the central rotational shaft 20. Such a rotational driving of the outer tube 40 allows for a more stable rotation of the outer tube 40 than in the before-mentioned embodiments. Further, as the rotating drive of the outer tube 40 is performed to respective ones of the hoop members 41 and 42 by the external gears 121 and 122 (that is, at both horizontal ends of the outer tube 40), the outer tube 40 is kept free of distortions, even if the axial length is large.

In the above embodiment, the outer tube 40 has four rolling rubber rolls 70 arranged therein to divide an inside of the outer tube 40 into four, to provide four thermo-control zones, while the number of thermo-control zones is not limited to four, and may be a minimal number, as necessary. That is, the number of thermo-control zones may be two, three, five, or more.

Figure 14:
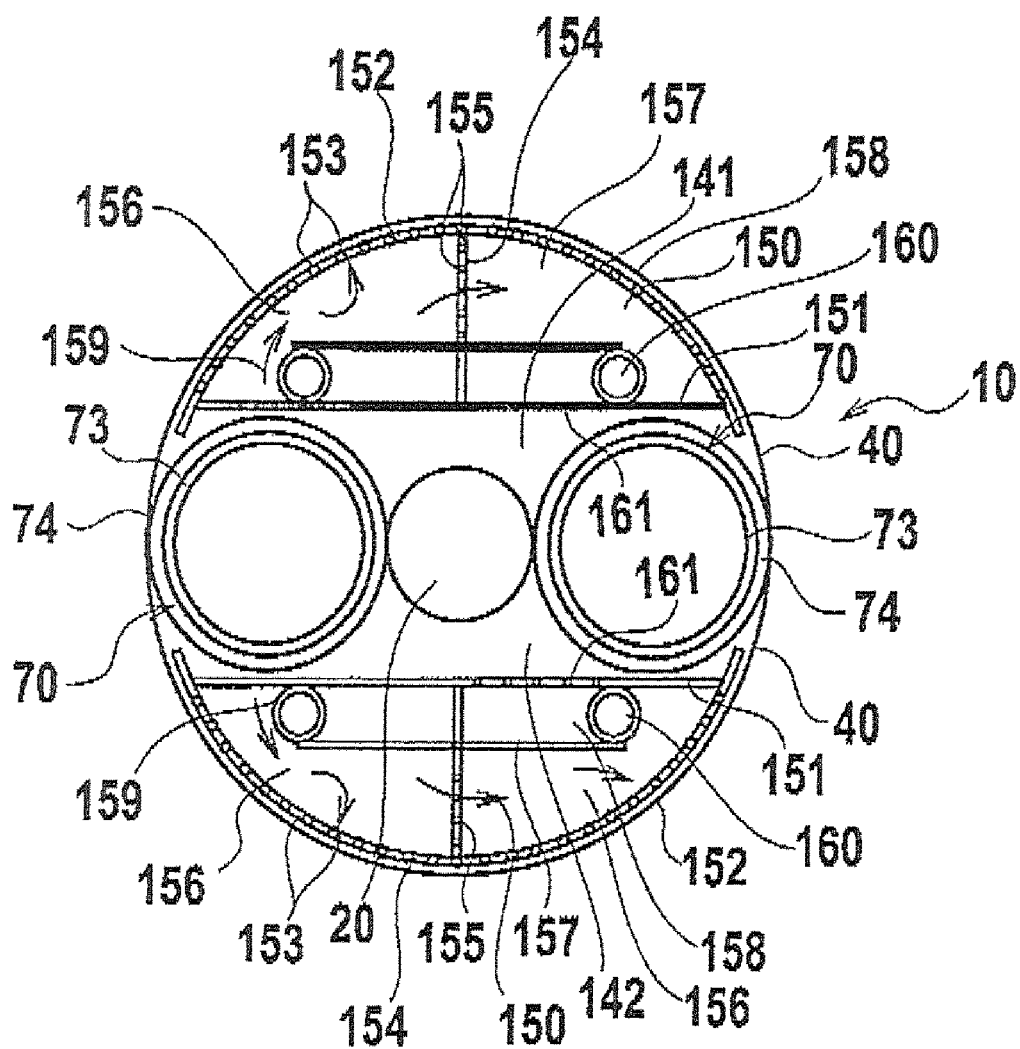
FIG. 14 This is a sectional view illustrating another embodiment of a sheet or film forming roll according to this invention.

FIG. 14 illustrates an embodiment that includes a pair of rolling robber rolls 70 arranged in outer tube 40 to divide an inside of the outer tube 40 into two, to provide two thermo-control zones. It is noted that in FIG. 14 also, those parts corresponding to FIG. 1 to FIG. 3 are designated at the same reference characters as the reference characters in FIG. 1 to FIG. 3, to eliminate redundant description.

This embodiment has a first heat medium chamber 141 and a second heat medium chamber 142 defined by the paired roiling robber rolls 70 dividing the inside of outer tube 40 into two. The first heat medium chamber 141 and the second heat medium chamber 142 have their heat medium supply and discharge mechanisms 150 arranged thereto.

The heat medium supply and discharge mechanisms 150 each have a flat planer member 151, and an arcuate planer member 152 welded to the flat planer member 151 to extend close to an inner circumferential surface of the outer tube 40. The flat planer member 151 and the arcuate planer member 152 are extended over axial length of the outer tube 40, the arcuate planer member 102 having a multiplicity of heat medium spouting holes 153 opened substantially in an entire region thereof.

The heat medium supply and discharge mechanisms 150 each have a heat medium supply chamber 156 defined inside a connected combination of the flat planer member 151 and the arcuate planer member 152 enclosed at both ends with end plates (not shown) like the before-mentioned embodiments. The heat medium supply chamber 156 is supplied with heat medium through a heat medium supply pipe 159. Further, the heat medium supply and discharge mechanisms 150 have heat medium discharge chambers 158 defined by flat planer members 151 and bulkhead plates 154 and 157, respectively. The heat medium discharge chambers 158 each communicate with the first heat medium chamber 141 or the second heat medium chamber 142, whichever is in communication therewith through communication holes 161 opened in the flat planer member 151. The heat medium discharge chambers 158 are each provided with a heat medium discharge pipe 160. Further, the bulkhead plates 154 have communication holes 155 provided therethrough.

In this embodiment, for each of the first heat medium chamber 141 and the second heat medium chamber 142, flux of heat medium is admitted to be supplied from the heat medium supply pipe 159 to the heat medium supply chamber 156, spout from heat medium spouting holes 153 toward an inner circumferential surface of the outer tube 40, flow outside the heat medium supply chamber 156, and strike through communication holes 161 into the heat medium discharge chamber 158, to be discharged outside through the heat medium discharge pipe 160. That is, heat medium is individually independently conducted for each of the first heat medium chamber 141 and the second heat medium chamber 142.

This permits temperatures of flux of heat medium being supplied to the heat medium supply pipe 159 of a respective one of the first heat medium chamber 141 and the second heat medium chamber 142 to be individually set, to thereby individually set surface temperatures of the outer tube 40 at a belt-like zone corresponding to the first heat medium chamber 141 and at a belt-like zone corresponding to the second heat medium chamber 142. In other words, the outer tube 40 is allowed to have surface temperatures individually set for the first heat medium chamber 141 and the second heat medium chamber 142 as thermo-control zones set off in a roll rotational direction.

Figure 12:
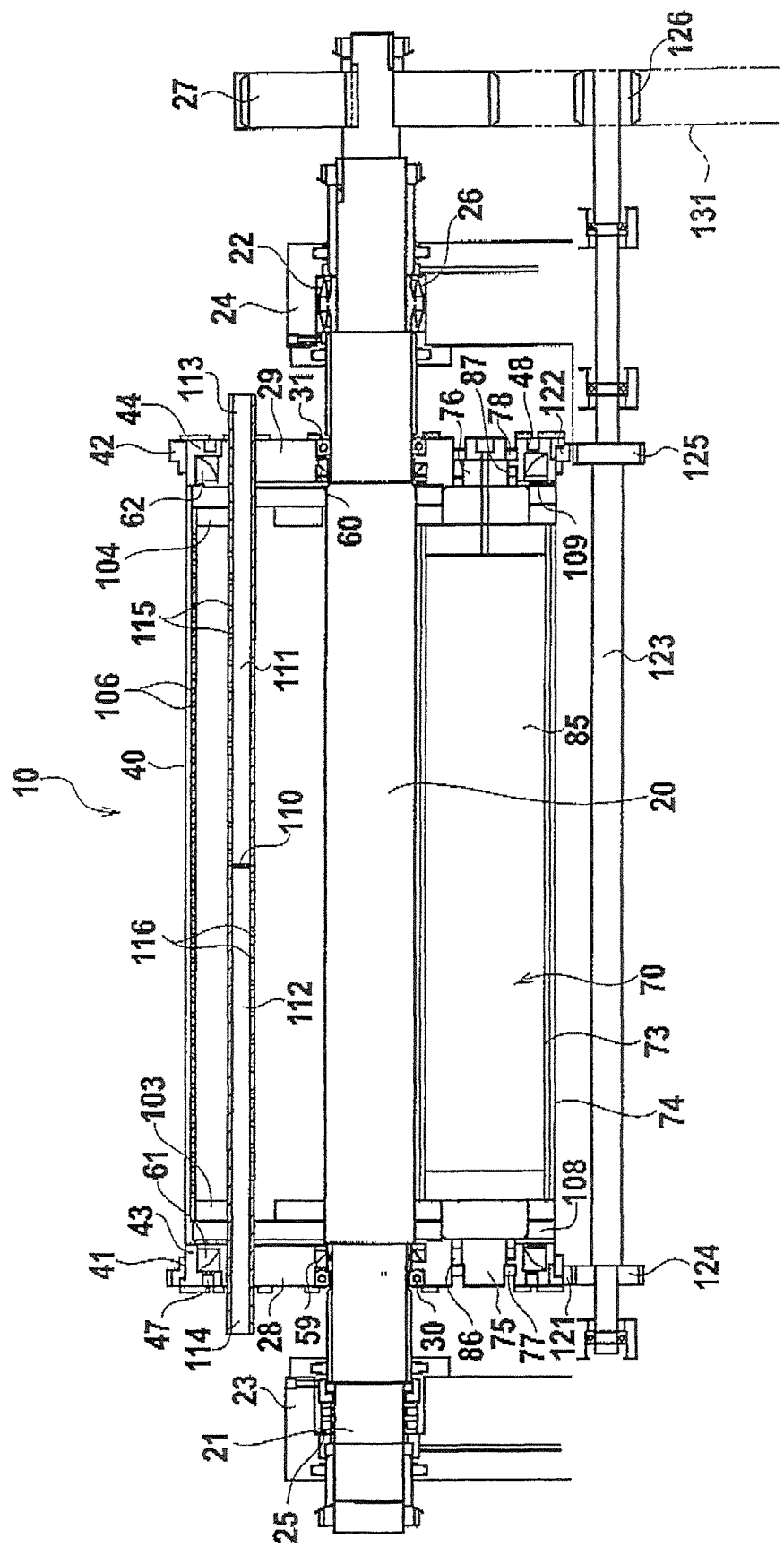
FIG. 12 This is a longitudinal sectional view illustrating another embodiment of a sheet or film forming roll according to this invention.
Figure 13:
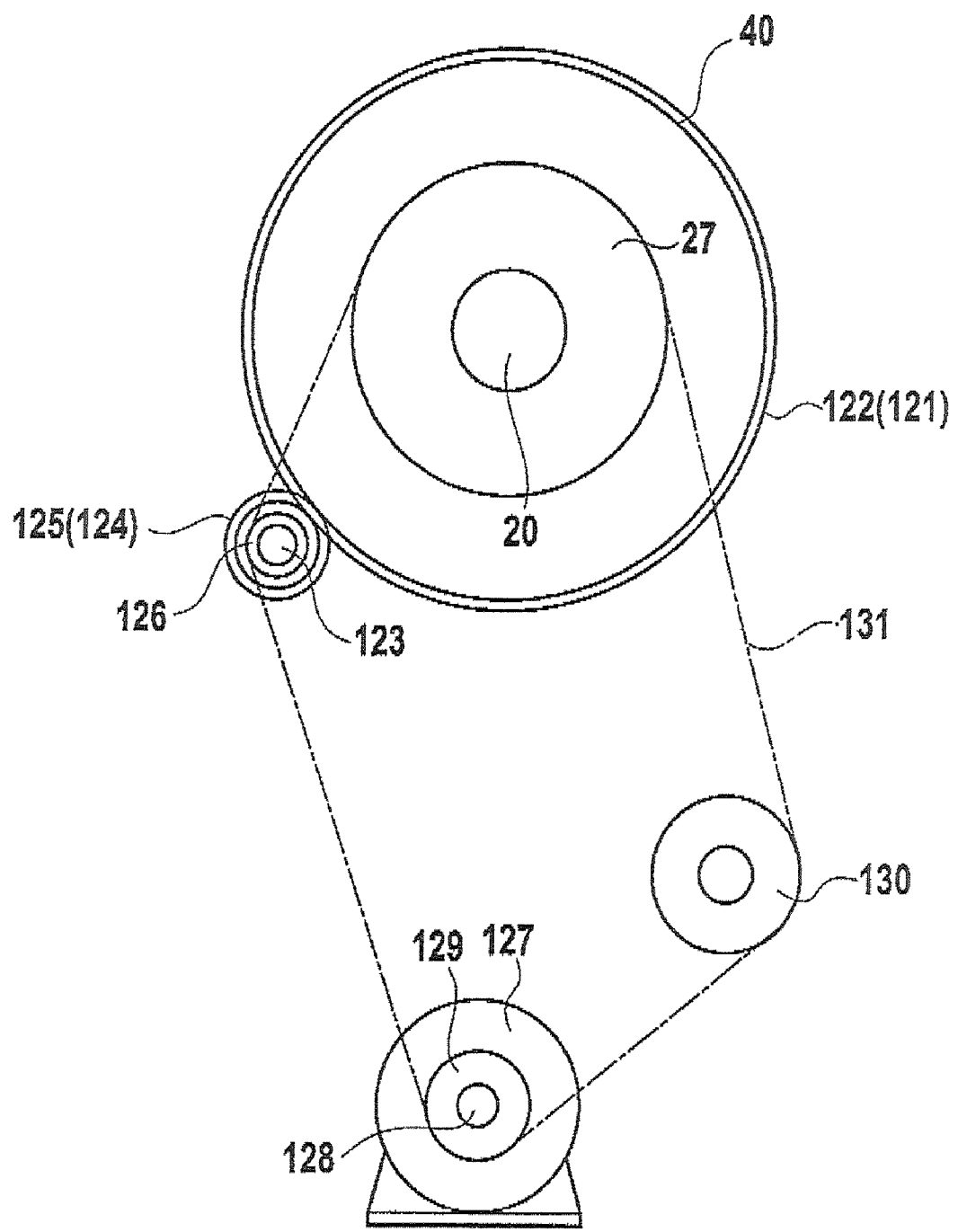
FIG. 13 This is an explanatory view of the sheet or film forming roll according to the other embodiment.

It is noted that also the sheet or film forming roll 10 illustrated in FIG. 12 and FIG. 13, as well as the sheet or film forming roll 10 illustrated in FIG. 14, is adaptive, like the sheet or film forming roll 10 according to the embodiment illustrated in FIG. 1 to FIG. 4, as a main roll for, among others, touch roll type sheet or film casting apparatuses or miniature pattern transferring apparatuses.

INDUSTRIAL APPLICABILITY

According to the present invention, a sheet or film forming roll includes rolling rubber rolls configured to set off an annular space between a central rotational shaft and an outer tube into a plurality of heat medium chambers, the rolling rubber rolls being adapted to work as backup rollers for the outer tube, thus affording for the outer tube to be kept from being deformed in applications such as to a touch roll type casting, even though the outer tube is rendered as a thin-wall structure having a small heat capacity in order for roll surface temperatures to be defined to differentiate by roll-circumferentially divided thermo-control zones, allowing for a secured sufficient pressing force, and an adequate implementation such as of a touch roll type casting.

The invention claimed is:

1. A sheet or film forming roll comprising:
a central rotational shaft rotatively supported by bearing members;
stationary end plates respectively concentrically arranged at end portions of the central rotational shaft;
a metallic filmed outer tube supported by the stationary end plates at both ends thereof to be rotative concentrically to the central rotational shaft;
a plurality of rolling rubber rolls each rotatively supported at both ends thereof by the stationary end plates and adapted for a sliding contact with an outer circumferential surface of the central rotational shaft and a sliding contact with an inner circumferential surface of the outer tube; and
a plurality of heat medium chambers defined by outer circumferential surfaces of the rolling rubber rolls, the inner circumferential surface of the outer tube, and the outer circumferential surface of the central rotational shaft,
the plurality of heat medium chambers being each respectively configured for individual conduction of heat medium.

2. The sheet or film forming roll according to claim 1, wherein the plurality of heat medium chambers each respectively have a heat medium supply and discharge mechanism comprising a multiplicity of heat medium spouting holes substantially over an entire region thereof along a width in an axial direction of the outer tube.

3. The sheet or film forming roll according to claim 1, wherein the rolling rubber rolls are hollow rolls each adapted for a variable setting of pressure in an internal space thereof.

4. The sheet or film forming roll according to claim 1, comprising an outer tube rotating drive member at a respective one of both axial end portions of the outer tube.

5. A sheet or film casting apparatus comprising: a touch roll, and a sheet or film forming roll according to claim 1 adapted as a main roll thereof.

6. A miniature pattern transferring apparatus comprising a sheet or film forming roll according to claim 1 adapted as a main roll thereof.

* * * * *